United States Patent [19]

Kendzior

[11] 4,038,721
[45] Aug. 2, 1977

[54] RECIPROCATING BLADE SAW

[75] Inventor: Leo J. Kendzior, Meriden, Conn.

[73] Assignee: Jarvis Products Corporation, Middletown, Conn.

[21] Appl. No.: 652,986

[22] Filed: Jan. 28, 1976

[51] Int. Cl.² .................... A22B 5/20; B27B 19/04
[52] U.S. Cl. ................................ 17/23; 30/394
[58] Field of Search ............. 17/23; 30/394, 392, 30/393, 182, 183, 184, 208, 209; 83/748, 746, 697; 74/44, 40, 42, 50

[56] References Cited

U.S. PATENT DOCUMENTS

| 2,746,493 | 5/1956 | Babcock | 30/394 |
| 3,270,369 | 9/1966 | Mandell | 17/23 |
| 3,729,823 | 5/1973 | Bos et al. | 30/394 |

*Primary Examiner*—Hugh R. Chamblee
*Attorney, Agent, or Firm*—DeLio and Montgomery

[57] ABSTRACT

A drive system for a reciprocating blade saw wherein a motor rotates an eccentric which rocks a bell crank to reciprocate the saw blade, the eccentric and the bell crank being associated with masses which rotate and rock 180° out of phase with the eccentric and bell crank and are so proportioned as to counterbalance those elements and minimize the vibration of the system. The counterbalancing masses are divided and mounted each side of the working elements so that no lateral torque forces are developed.

4 Claims, 5 Drawing Figures

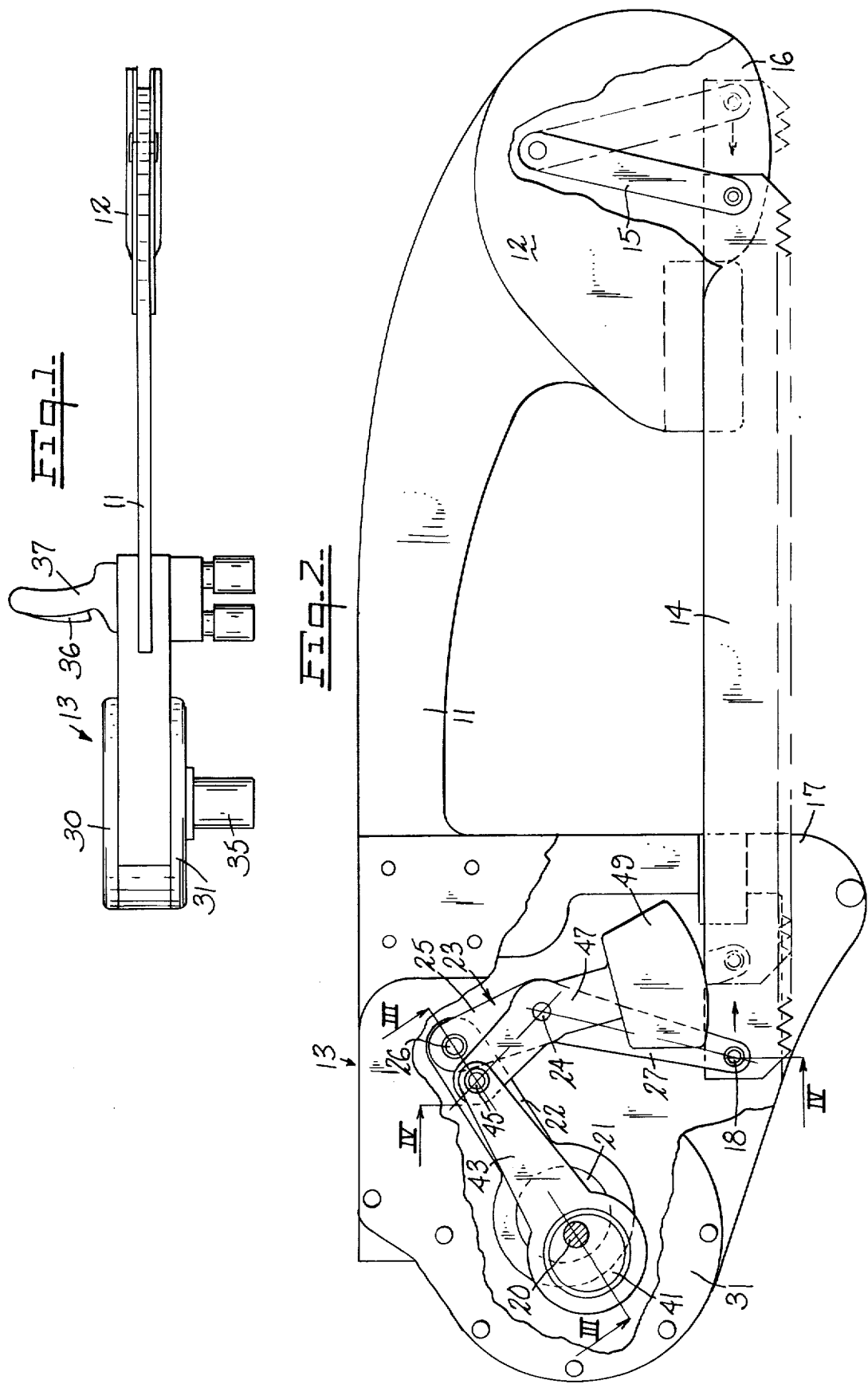

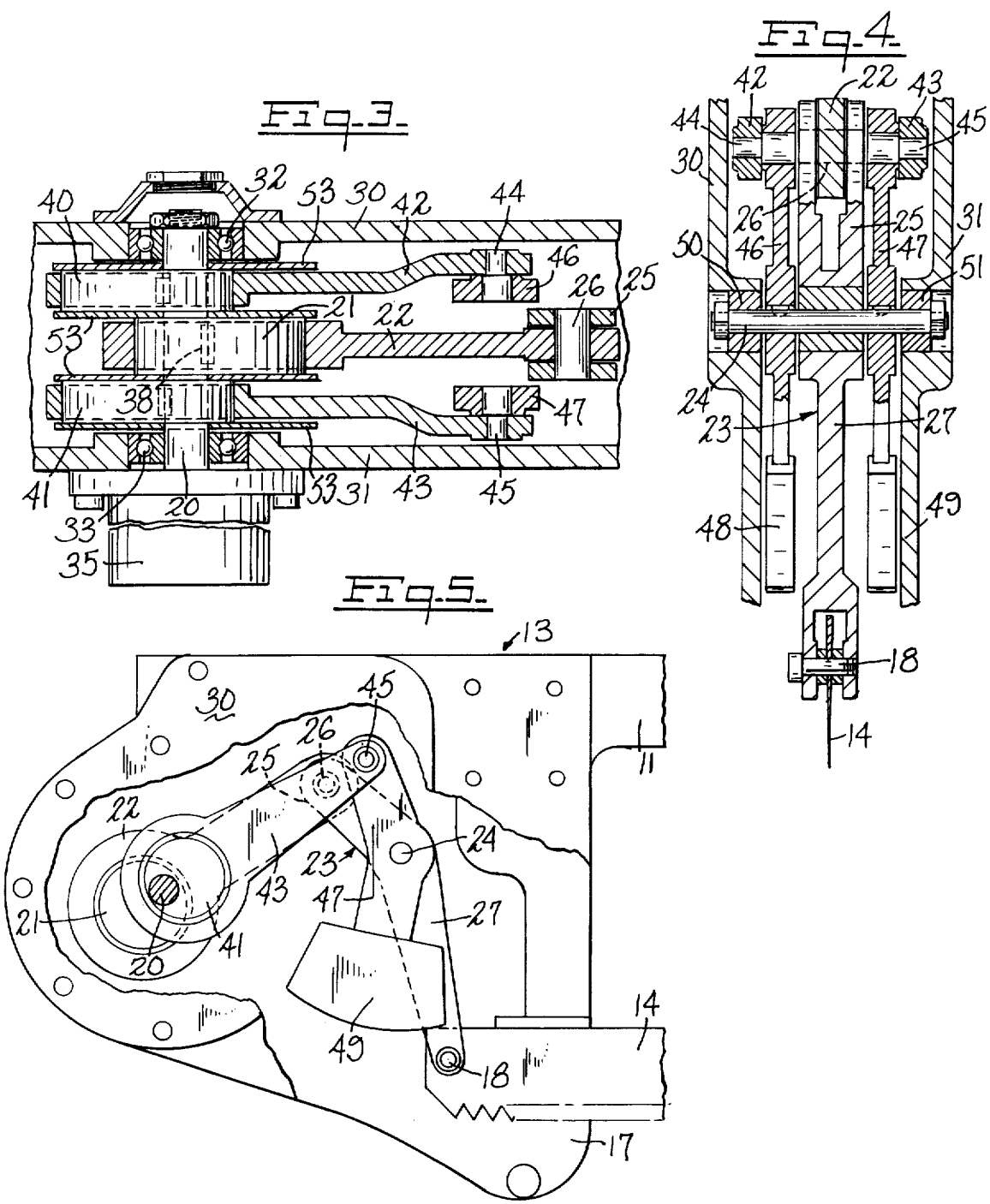

RECIPROCATING BLADE SAW

This invention relates to counterbalancing means for the drive system of a reciprocating blade saw, and particularly a heavy duty high speed saw wherein a motor rotates an eccentric which rocks a bell crank to reciprocate the saw blade, the counterbalancing means including masses which rotate and rock 180° out of phase with the eccentric and bell crank to counterbalance the centrifugal and inertial forces developed thereby and thus to minimize the vibration of the system in operation.

A heavy duty high speed saw of the type designed for splitting an animal carcass comprises a frame, a blade about 30" long and drive means including a motor (preferably hydraulic) rotating a drive shaft which carries an eccentric connected by a pitman to one arm of a bell crank, the other arm of which is connected to one end of the blade. Rotating movement of the drive shaft is thus converted to reciprocating linear movement of the blade. At operating speeds of 2000 r.p.m. or more the eccentric creates centrifugal vibrations of the same frequency and the rocking of the bell crank to reciprocate the saw blade creates inertial vibrations at its points of reversal. Such vibrations tend to make the saw noisy and uncomfortable to use, and to reduce the service life of some parts. Counterbalancing elements for a single eccentric cam driving directly a reciprocating saw blade are known, as shown in Mandell U.S. Pat. No. 3,270,369, but the interposition of the bell crank connection shown herein creates different vibration problems.

It is accordingly an object of the invention to provide counterbalancing elements which are effective to eliminate or substantially reduce the vibration caused by imbalance of the rotating and reciprocating parts of the saw by providing a system of eccentric drive cams and levers so disposed as to counteract the vibrating forces generated in the reciprocating blade saw.

It is another object of the invention to divide the counterbalancing elements and mount them in positions straddling the working parts of the drive train, to prevent the development of any lateral torque.

It is a further object of the invention to provide counterbalancing elements which are so proportioned and located that they are equally effective at all speeds of operation.

It is still a further object of the invention to provide certain improvements in the form, construction and arrangement of the several parts whereby the above named and other objects may effectively be attained.

The invention accordingly comprises the features of construction, combination of elements, and arrangement of parts which will be exemplified in the construction hereinafter set forth, and the scope of the invention will be indicated in the claims.

A practical embodiment of the invention is shown in the accompanying drawings wherein:

FIG. 1 represents a top plan view of the saw;

FIG. 2 represents a side elevation of the saw, on a larger scale, part of the housing being broken away and parts being in sections;

FIG. 3 represents a section on the line III—III of FIG. 2;

FIG. 4 represents a section on the line IV—IV of FIG. 2; and

FIG. 5 represents a detail elevation, similar to the left side of FIG. 2, showing the driving and counterbalancing elements in 180° different positions.

Referring to the drawings, the saw is shown as comprising the frame 11 connecting the distal end housing 12 to the drive assembly housing 13. The saw blade 14 is supported at one end by a link 15 in the distal end housing and is movable longitudinally in a slot or guideway 16 in the lower portion of the end housing. The opposite end portion of the saw blade extends through a opening 17 into the drive assembly housing where it is attached at 18 to the drive train.

The working elements of the drive train include the main drive shaft 20, the eccentric cam 21, the drive link or pitman 22 and the bell crank 23, pivotally supported on the shaft 24 and comprising a first arm 25 connected at 26 to the end of the link or pitman 22 and a second arm 27 to which the saw blade is attached at 18.

The drive assembly housing 13 is constituted by side plates 30, 31 fixed to the frame 11 and the drive shaft 20 is journaled in bearings 32, 33 in the side plates, as shown in FIG. 3. The drive shaft is driven by a hydraulic motor 35 which is controlled through connections, not shown, by the trigger 36 in the handle 37. The eccentric cam 21 is keyed on the drive shaft as indicated at 38. The drive train so far described is known, but the housing 13 is here enlarged to accommodate the counterbalancing elements.

The counterbalancing system includes a pair of eccentric cams 40, 41, somewhat smaller than the cam 21 fixed on the drive shaft 20 each side of the cam 21 and offset angularly therefrom by 180°. Drive links or pitmans 42, 43 are mounted on the cams 40, 41 and are connected by pins 44, 45 to levers 46, 47 which are carried by the shaft 24, on each side of the bell crank 23. Each lever 46, 47 extends downward beyond its pivot point and supports a counterweight 48, 49. The levers 46, 47 may suitably be keyed to the shaft 24 which is rotatably mounted in bearings 50, 51 in the side plates 30, 31, as shown in FIG. 4.

Each eccentric cam 21, 40, 41 is provided with a suitable ball or roller bearing, not shown, on its periphery and the washers 53, shown in FIG. 3, aid in locating and supporting oil seal rings, not shown, adjacent the bearings which are lubricated in a conventional manner through the drive shaft.

In operation, the drive shaft is driven by the motor 35 to reciprocate, by means of the cams, the pitmans 22, 42, 43; the pitmans rock, respectively, the bell crank 23 and levers 46, 47; the bell crank 23 reciprocates the saw blade 14 and the levers 46, 47 oscillate the counterweights 48, 49.

Vibrational forces are generated, in the basic drive train, by the rotation of the eccentric cam 21 which exerts centrifugal force in all directions within its plane of rotation, by the rotation of the larger end of the pitman 22 which adds to the centrifugal forces generated by the cam, by the linear reciprocation of the pitman 22 which exerts inertial forces at each end of its travel, and by the bell crank 23 which exerts inertial forces of acceleration and deceleration at every point in its cycle of movement. The mass of the saw blade, moving with the bell crank, adds to the inertial forces thereof. From the description of the counterbalancing system, and assuming that the mass and location of its elements have been accurately calculated, it will be apparent that the eccentric cams 40, 41 each side of the cam 21 form with said cam 21 a symmetrical assembly which can rotate around the axis of the drive shaft without vibration, because the mass of cam 21, extending in one direction, is exactly balanced by the masses of cams 40, 41, extending in the opposite direction. The annular ends of the pitmans, each surrounding a cam and movable therewith, add to the centrifugal forces but are designed not to unbalance the assembly. The pitmans 42, 43 and levers 46, 47 are so disposed that their masses, including counterweights 48, 49, correspond kinetically, but in the opposite sense, to the masses of the bell crank, saw blade and pitman 22, the movements of these elements being linear on short arcs.

The arragement of elements as disclosed can be operated at any desired speed with minimal vibration of the whole system due to the inherent counterbalancing of all eccentric, oscillatory or reciprocatory parts.

Where a working element is reciprocated directly by an eccentric among a single axis the vibratory forces are mainly in the direction of said axis, but when an eccentric acts along an axis lying in a first direction, to reciprocate (through a bell crank) a working element which moves on an axis lying in a second direction at an angle to the first, the vibratory forces become complex. Such forces are, however, substantially completely counterbalanced by the means disclosed herein, where every move of every part of the drive train is accompanied by a corresponding move, in the opposite sense, by equivalent masses in the counterbalancing system.

It may thus be seen that the objects of the invention set forth as well as those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A reciprocating blade saw comprising an eccentric mounted on a drive shaft, means for driving said shaft, a bell crank on a second shaft, a pitman connecting the eccentric to one arm of the bell crank, a saw blade connected to the other end of the bell crank and supported for substantially linear reciprocation upon rocking of the bell crank, constituting the saw drive train, and counterbalancing means including at least one additional eccentric mounted on the drive shaft closely adjacent the first eccentric and oriented angularly 180° therefrom, at least one lever pivoted intermediate its ends on the second shaft, a second pitman connecting the additional eccentric to one end of the lever, and a mass carried by the other end of said lever, the sizes and location of the counterbalancing means being calculated to substantially counterbalance the centrifugal and inertial forces developed by operation of the saw drive train.

2. A reciprocating blade saw according to claim 1 wherein the counterbalancing means comprises two eccentrics oriented as claimed, two levers, two second pitmans and two masses, associated to constitute duplicate counterbalancing element trains disposed one on each side of the saw drive train.

3. The combination with a drive train, comprising a drive shaft, a first eccentric fixed thereon, a bell crank pivotally supported intermediate its ends, a first pitman connecting the eccentric to one arm of the bell crank for oscillation of the end of said one arm substantially along a first line and an element connected to the other arm of the bell crank for reciprocation by the end of said other arm substantially along a second line, of counterbalancing means which comprise a pair of second eccentrics fixed on the drive shaft one on each side of the first eccentric and angularly displaced 180° therefrom, a pair of levers pivotally supported one on each side of the bell crank, a pair of second pitmans each connecting a second eccentric to one end of a respective lever and a pair of masses each carried by the other end of a respective lever, the dimensions of the elements comprising the counterbalancing means being calculated to counteract centrifugal and inertial forces developed in the operation of the drive train.

4. The combination according to claim 3 wherein the line of oscillation of the end of said one arm of the bell crank lies at an acute angle to the line of reciprocation of the end of the other arm of the bell crank.

* * * * *